R. W. FUNK.
VEHICLE WHEEL RIM.
APPLICATION FILED JAN. 15, 1912.
1,146,422.
Patented July 13, 1915.
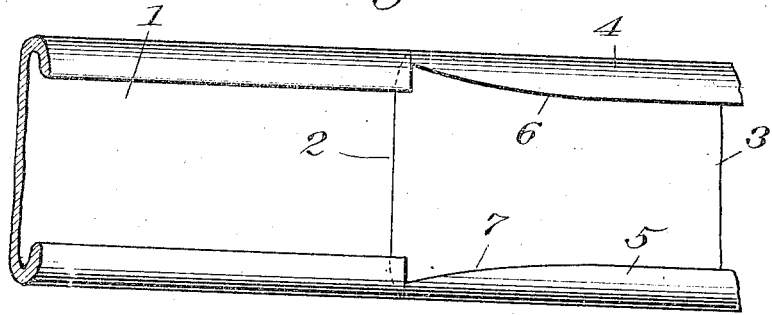
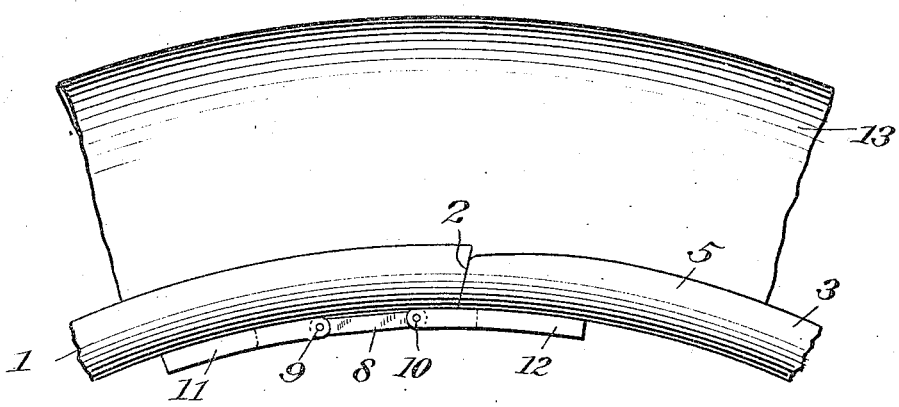
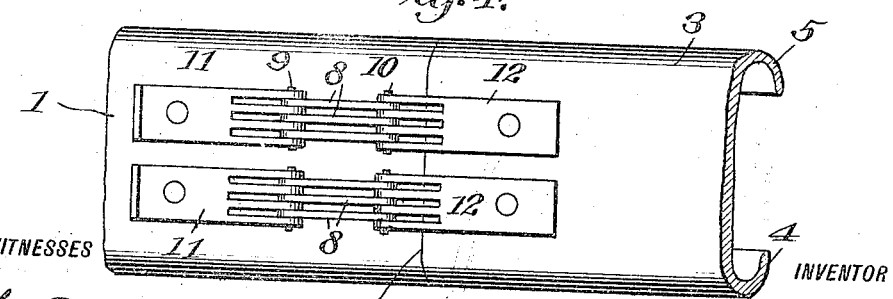
WITNESSES
INVENTOR
Richard W. Funk
BY Seward Davis
ATTORNEY

UNITED STATES PATENT OFFICE.

RICHARD W. FUNK, OF WEEHAWKEN, NEW JERSEY, ASSIGNOR TO R. W. FUNK, INCORPORATED, OF NEW YORK, N. Y., A CORPORATION OF NEW YORK.

VEHICLE WHEEL-RIM.

1,146,422.   Specification of Letters Patent.   Patented July 13, 1915.

Application filed January 15, 1912. Serial No. 671,170.

*To all whom it may concern:*

Be it known that I, RICHARD W. FUNK, a citizen of the United States, residing in the city of Weehawken, county of Hudson, and State of New Jersey, have invented certain new and useful Improvements in Vehicle Wheel-Rims, of which the following is a specification.

My invention relates to tire-carrying rims which are transversely split for the purpose of permitting the ready removal therefrom of their associated tires.

The use of pneumatic tires which are subject to deflation from accidental cause is so widespread in automobile service that an efficient means for permitting the replacement of a damaged tire with a perfect one is now regarded as requisite. My invention deals with that type of rim which is transversely split to permit the collapse of the rim and thus allow the removal of the tire from it, and my invention is particularly directed to a peculiar form of rim of this general type which makes disengagement of the rim from the tire positive and smooth and prevents the possibility of damage to the tire, which has formed a strong objection hitherto to this type of rim, especially when used with tires having inextensible beads for engagement with the rim.

In order to promote the ready disengagement of the tire from the rim when the latter is collapsed by forcing one section of the rim adjacent to the split therein either radially inward or by causing it to telescope with the adjacent section of the rim, I cut away or taper on a smooth curve one or both clenches of a section of the rim adjacent to the split. The resulting effect upon the tire when the rim is collapsed is to cause the beads of the tire to be pressed together by a sort of wedging action on the part of the tapered clenches when the rim is distorted from its normal configuration and thus positively to cause the beads of the tire to disengage from the clenches of the rim throughout a considerable portion of their periphery. The complete removal of the tire is then a simple matter.

In the accompanying drawings which form a part of this specification, Figure 1 is a top view of a section of a transversely split tire-carrying rim constructed according to my improved design; Fig. 2 is a side elevation of the portion of the rim shown in Fig. 1; Fig. 3 illustrates an alternative construction in which linkage is used to span the split in the rim; Fig. 4 is a side elevation of the structure shown in Fig. 3.

Referring to the drawings in detail, the numeral 1 designates the tire-carrying rim transversely split at 2 on a plane which may, as shown, be substantially perpendicular to the major plane of the rim but inclined to a radius. The section 3 of the rim which is adapted to be displaced away from the periphery when the rim is collapsed has the clenches 4 and 5 cut away or tapered along a smooth curve at 6 and 7.

In the construction shown in Figs 3 and 4 the rim is further provided with means for permanently connecting the sections on either side of the split. These means comprise links 8 pivoted at 9 and 10, respectively, to straps 11 and 12 riveted or otherwise secured to the inner periphery of the rim.

In the operation of the device, when one section of the rim, as 3, is distorted inwardly from the normal periphery of the rim, the beads of the tire 13, which are held under the clenches, are forced closer together by the action of the taper on the clenches of the rim section adjacent the split. These tapered edges exert a wedging action upon the tire and gently but firmly cause the disengagement of the beads of the tire from the portion of the rim which is being displaced. The action at first is purely local, but more and more of the tire is disengaged as the rim section continues to depart from the normal periphery, and a considerable portion is freed by the time the ends of the rim are substantially out of line. The remainder of the tire may then be readily removed from the rim, a new tire placed over the rim and alined therewith, whereupon the shifting of the ends of the rim into their initial position will cause a reversal of the original operation, and the clenches will take hold of the beads of the tire without further effort on the part of the operator.

Any suitable means may be used for causing the distortion of the rim as outlined, such for instance as that illustrated and described in my co-pending application for United States Letters Patent for tools for operating vehicle wheel rims, filed January 15, 1912, Serial Number 671,169. While I regard the curvature given to the clenches as shown in the drawings to be substantially the best adapted for the purpose, I appreciate that many alterations may be made in this regard without departing from the spirit of my invention, and I do not wish to be limited to the precise construction illustrated and described.

Having thus described my invention, I claim:

1. A transversely split clencher rim having the portions of its clenches adjacent to and upon the same side of the split cut away, each upon a compound curve, presenting continuous opposed wedging surfaces to cause the beads of said tire to tend to leave said clenches when the ends of said rim are moved into overlapping position.

2. A transversely split clencher rim for tires having inextensible beads, the opposite portions of the clenches adjacent to the split being tapered from the upper portion of the clench first outwardly and then downwardly toward the rim base, permitting the inextensible beads of said tire to withdraw from said clenches when the ends of said rim are moved into overlapping position.

3. A transversely split tire-carrying clencher rim having a portion of the clench adjacent to the split cut away for a small arc of the circumference on one side of the split therein and adjacent thereto, from the top of the clench outwardly and downwardly toward the rim base to permit a bead of said tire to be withdrawn from said clench when the ends of said rim are moved into overlapping position.

4. A transversely split tire-carrying clencher rim having portions of the opposed clenches adjacent to the split cut away on homologous curves diverging toward the split and tangent to the normal periphery of the clenches at points more remote from the split to exert a wedging action on a bead of said tire and permit the tire to be withdrawn from said clench when the ends of said rim are moved into overlapping position.

5. A tire-carrying rim transversely split on a plane substantially perpendicular to the plane of the rim but inclined to a radius thereof, having portions of the clenches adjacent to said split cut away from the upper portion of the clench outwardly and downwardly toward the rim base to cause the beads of said tire to approach and withdraw from said clenches when the ends of said rim are moved into overlapping position.

6. A tire-carrying rim transversely split on a plane substantially perpendicular to the plane of the rim but inclined to a radius thereof having portions of the clenches adjacent to said split cut away for a small arc of the circumference on one side of the split therein, from the top of the clench outwardly toward the rim base to cause a bead of said tire to be withdrawn from said clench when the ends of said rim are moved into overlapping position.

7. A tire-carrying rim transversely split on a plane substantially perpendicular to the plane of the rim but inclined to a radius thereof, the clench of the rim on one side of the split therein being tapered toward the split in the rim, and linkage connecting the ends of the rim.

8. A tire-carrying rim transversely split on a plane substantially perpendicular to the plane of the rim but at an angle to a radius thereof, the portion of the rim on one side of the split therein having its clenches cut away on homologous curves diverging toward the split and tangent to the normal periphery of the clenches at points more remote from the split.

9. A tire-carrying rim transversely split on a plane substantially perpendicular to the plane of the rim but at an angle to a radius thereof, the portion of the rim on one side of the split therein having its clenches cut away on homologous curves diverging toward the split and tangent to the normal periphery of the clenches at points more remote from the split, and linkage connecting the ends of the rim.

RICHARD W. FUNK.

Witnesses:
GERALD E. TERWILLIGER,
OLIVER WILLIAMS.

Copies of this patent may be obtained for five cents each, by addressing the "Commissioner of Patents, Washington, D. C."